(12) United States Patent
Montgomery et al.

(10) Patent No.: US 12,294,128 B2
(45) Date of Patent: May 6, 2025

(54) SYSTEMS AND METHODS FOR ENERGY GENERATION DURING HYDROGEN REGASIFICATION

(71) Applicant: Caterpillar Inc., Peoria, IL (US)

(72) Inventors: David T. Montgomery, Edelstein, IL (US); Robert M. McDavid, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 105 days.

(21) Appl. No.: 17/649,888

(22) Filed: Feb. 3, 2022

(65) Prior Publication Data
US 2023/0246211 A1   Aug. 3, 2023

(51) Int. Cl.
| | |
|---|---|
| H01M 8/04858 | (2016.01) |
| F02B 63/04 | (2006.01) |
| F02B 75/02 | (2006.01) |
| F02M 21/02 | (2006.01) |
| F02M 21/06 | (2006.01) |
| H01M 8/04014 | (2016.01) |
| H01M 8/04082 | (2016.01) |
| H01M 8/04119 | (2016.01) |

(52) U.S. Cl.
CPC ......... *H01M 8/04925* (2013.01); *F02B 63/04* (2013.01); *F02B 75/02* (2013.01); *F02M 21/0206* (2013.01); *F02M 21/06* (2013.01); *H01M 8/04014* (2013.01); *H01M 8/04119* (2013.01); *H01M 8/04201* (2013.01)

(58) Field of Classification Search
CPC ......... Y02E 60/50; Y02E 10/56; Y02E 60/36; Y02E 70/30; Y02E 10/76; Y02T 10/12; Y02T 90/40; F02M 21/0206; H01M 2250/20; B60L 1/003; H02J 3/381
See application file for complete search history.

(56) References Cited

U.S. PATENT DOCUMENTS

| | | | | |
|---|---|---|---|---|
| 3,336,162 A | * | 8/1967 | Zachmann | H01M 8/182 |
| | | | | 429/444 |
| 5,540,831 A | * | 7/1996 | Klein | C25B 1/02 |
| | | | | 425/231 |

(Continued)

FOREIGN PATENT DOCUMENTS

| | | | | |
|---|---|---|---|---|
| CA | 2304046 C | * | 11/2008 | B60L 1/003 |
| SU | 1020685 A1 | | 5/1983 | |

(Continued)

OTHER PUBLICATIONS

WO-2007063645-A1, English Language Machine Translation (Year: 2007).*

*Primary Examiner* — Wesley G Harris
(74) *Attorney, Agent, or Firm* — Bookoff McAndrews, PLLC

(57) ABSTRACT

Energy generation systems and methods are disclosed. An energy generation system includes a fuel tank configured to store a fuel in liquid form and a power generating device including a fuel cell or an internal combustion engine configured to receive the fuel and generate electrical energy with the fuel. The energy generation system also includes an expander connected between the fuel tank and the power generating device, the expander configured to receive the fuel as a gas and a generator connected to the expander so as to generate electrical energy when fuel passes through the expander.

12 Claims, 3 Drawing Sheets

(56) References Cited

U.S. PATENT DOCUMENTS

| | | | |
|---|---|---|---|
| 9,666,889 B2 * | 5/2017 | Loignon | H01M 8/0494 |
| 11,009,185 B2 | 5/2021 | Li et al. | |
| 2002/0112479 A1 * | 8/2002 | Keefer | F17C 11/005 |
| | | | 60/659 |
| 2002/0162698 A1 * | 11/2002 | Oglesby | H01M 16/006 |
| | | | 180/68.5 |
| 2002/0163200 A1 * | 11/2002 | Oglesby | B60L 58/30 |
| | | | 290/52 |
| 2004/0151959 A1 * | 8/2004 | Formanski | H01M 8/04022 |
| | | | 429/439 |
| 2007/0138006 A1 * | 6/2007 | Oakes | B60L 58/30 |
| | | | 204/266 |
| 2014/0026575 A1 * | 1/2014 | Spadacini | F22B 27/06 |
| | | | 60/671 |
| 2020/0096157 A1 | 3/2020 | Kim et al. | |
| 2021/0198095 A1 | 7/2021 | Fairy | |

FOREIGN PATENT DOCUMENTS

| | | | | |
|---|---|---|---|---|
| WO | WO-9915762 A1 * | 4/1999 | | B60L 1/003 |
| WO | WO-9941490 A1 * | 8/1999 | | B60K 6/24 |
| WO | WO-2004070856 A2 * | 8/2004 | | H01M 2/00 |
| WO | WO-2007063645 A1 * | 6/2007 | | F01K 17/005 |

* cited by examiner

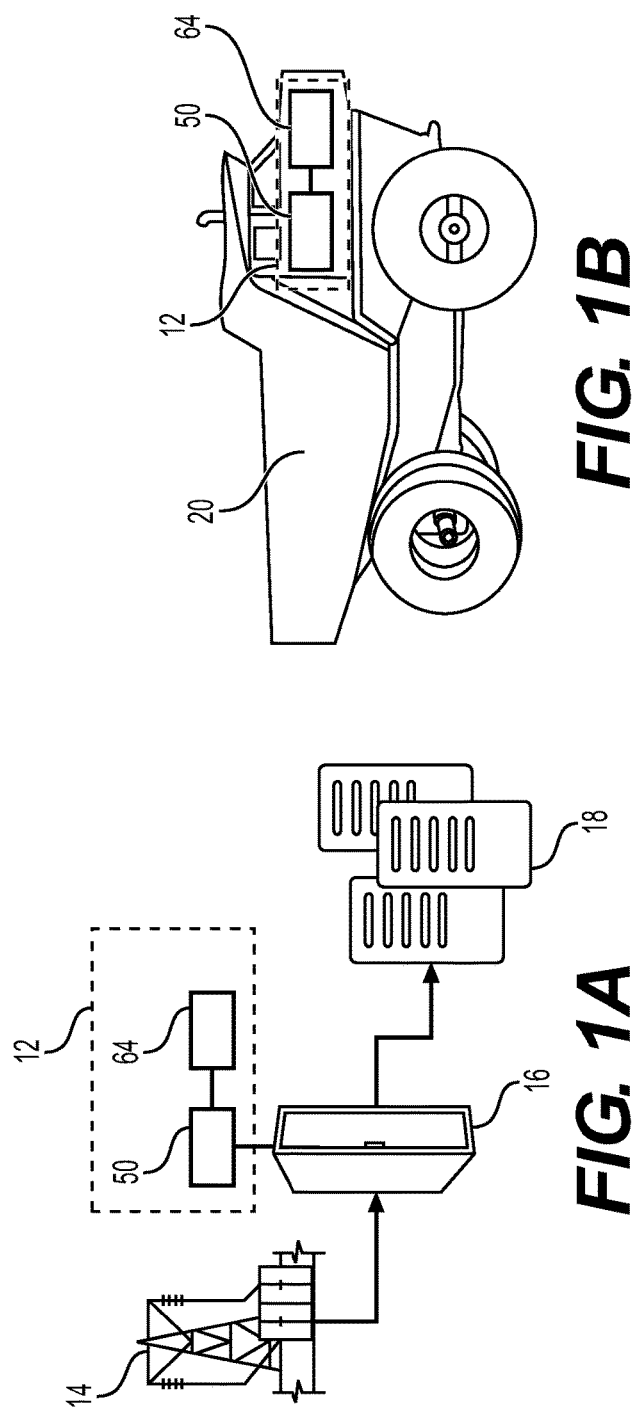
FIG. 1A
FIG. 1B
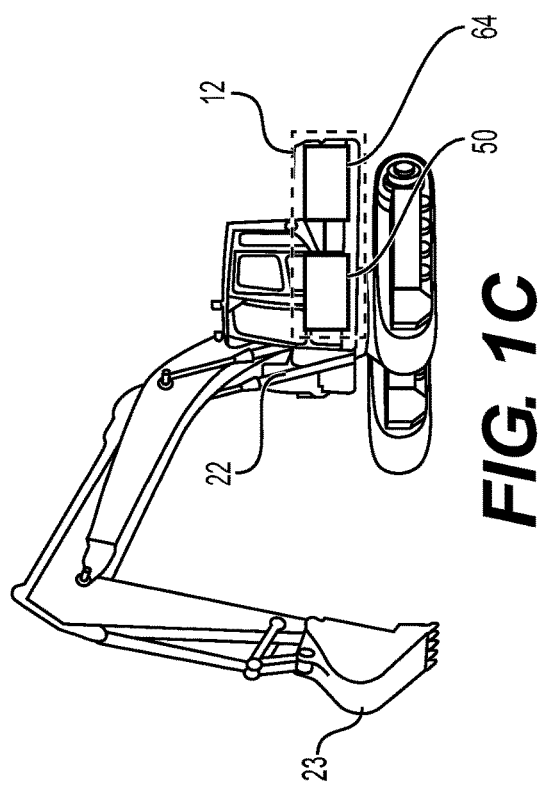
FIG. 1C

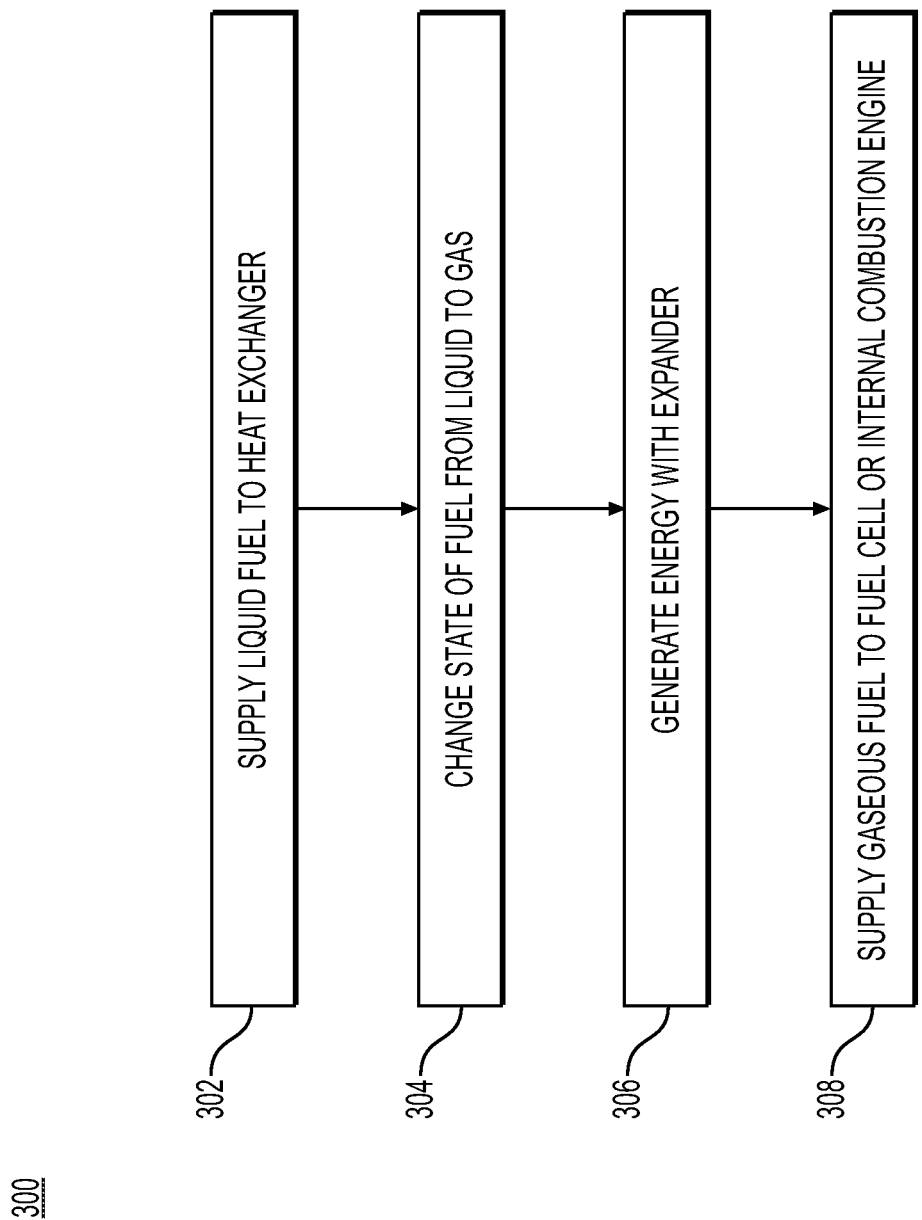

SYSTEMS AND METHODS FOR ENERGY GENERATION DURING HYDROGEN REGASIFICATION

TECHNICAL FIELD

The present disclosure relates generally to methods and systems for fuel cell systems and, more particularly, to systems and methods for generating energy during gasification of liquid fuel.

BACKGROUND

Internal combustion engines that combust gasoline or diesel fuel are employed in various applications to generate power as a primary power source or as a backup power source. While these engines are useful in various applications, diverse energy production methods are beneficial, including energy production from renewable fuel sources. These fuel sources, sometimes referred to as "alternative" fuels, can reduce reliance on fossil fuels such as gasoline and diesel fuel. It is also desirable to increase the availability of energy production systems that are able to reduce hydrocarbon and nitrogen oxide emissions. With this in mind, fuel cells and internal combustion engines have been designed for use with alternative fuels that are renewable and that can reduce or even eliminate hydrocarbon emissions. One exemplary alternative fuel, hydrogen, has been explored for various potential applications, including public transportation and passenger vehicles.

Although hydrogen fuel does have advantageous qualities, storage of a suitable quantity of hydrogen introduces challenges. For example, when stored as a gas, hydrogen can be pressurized, but due to hydrogen's relatively low volumetric energy density, pressurized hydrogen gas still provides a relatively low amount of energy. This can create particular challenges for many applications of hydrogen as a fuel, such as use of hydrogen fuel for backup energy or as a primary source of energy in systems with high power demands, such as data centers and mobile or stationary machines. While storing hydrogen in liquid form increases the amount of energy contained in a particular volume, storing hydrogen as a liquid involves the use of a significant amount of energy to pressurize and reduce the temperature of hydrogen. In fact, the amount of energy needed to liquefy hydrogen can be equivalent to approximately 30% of the energy stored in the hydrogen itself.

A method for regasification of liquid hydrogen is described in SU1020685 ("the '685 publication") to Budnevich et al. The method described in the '685 publication uses heat exchange between liquid hydrogen and a working fluid in order facilitate the production of another liquefied product, liquefied oxygen. While this method may be helpful for forming products such as gaseous nitrogen and liquid oxygen, it is unable to capture energy from liquid hydrogen that is supplied in gaseous form to an internal combustion engine or a fuel cell.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, an energy generation system may include a fuel tank configured to store a fuel in liquid form and a power generating device including a fuel cell or an internal combustion engine configured to receive the fuel and generate electrical energy with the fuel. The energy generation system may also include an expander connected between the fuel tank and the power generating device, the expander configured to receive the fuel as a gas and a generator connected to the expander so as to generate electrical energy when fuel passes through the expander.

In another aspect, an open-loop Rankine cycle system may include a liquid hydrogen storage device, a heat exchanger connected to the liquid hydrogen storage device and that is configured to convert liquid hydrogen to gaseous hydrogen, and a pump configured to pump the liquid hydrogen from the storage device towards the heat exchanger. The open-loop Rankine cycle system may also include an expansion device configured to receive the gaseous hydrogen and an outlet from which gaseous hydrogen is exhausted.

In yet another aspect, an energy generation method may include pumping liquid fuel from a storage device to a heat exchanger, adding heat to the liquid fuel to change the liquid fuel to gaseous fuel, and receiving the gaseous fuel with an expander and generating electrical energy with a generator connected to the expander. The method may also include supplying the gaseous fuel to a fuel cell to generate additional electrical energy or to an internal combustion engine to combust the gaseous fuel.

BRIEF DESCRIPTION OF THE DRAWINGS

FIG. 1A is a schematic diagram of an energy generation system used with a data center, according to aspects of the disclosure.

FIG. 1B is a schematic diagram of an energy generation system used with a mobile machine or vehicle, according to aspects of the disclosure.

FIG. 1C is a schematic diagram of an energy generation system used with an earthmoving machine, according to aspects of the disclosure.

FIG. 3 is a flowchart depicting an exemplary method for controlling a cooling system for an internal combustion engine or fuel cell, according to aspects of the disclosure.

DETAILED DESCRIPTION

Figure 2:
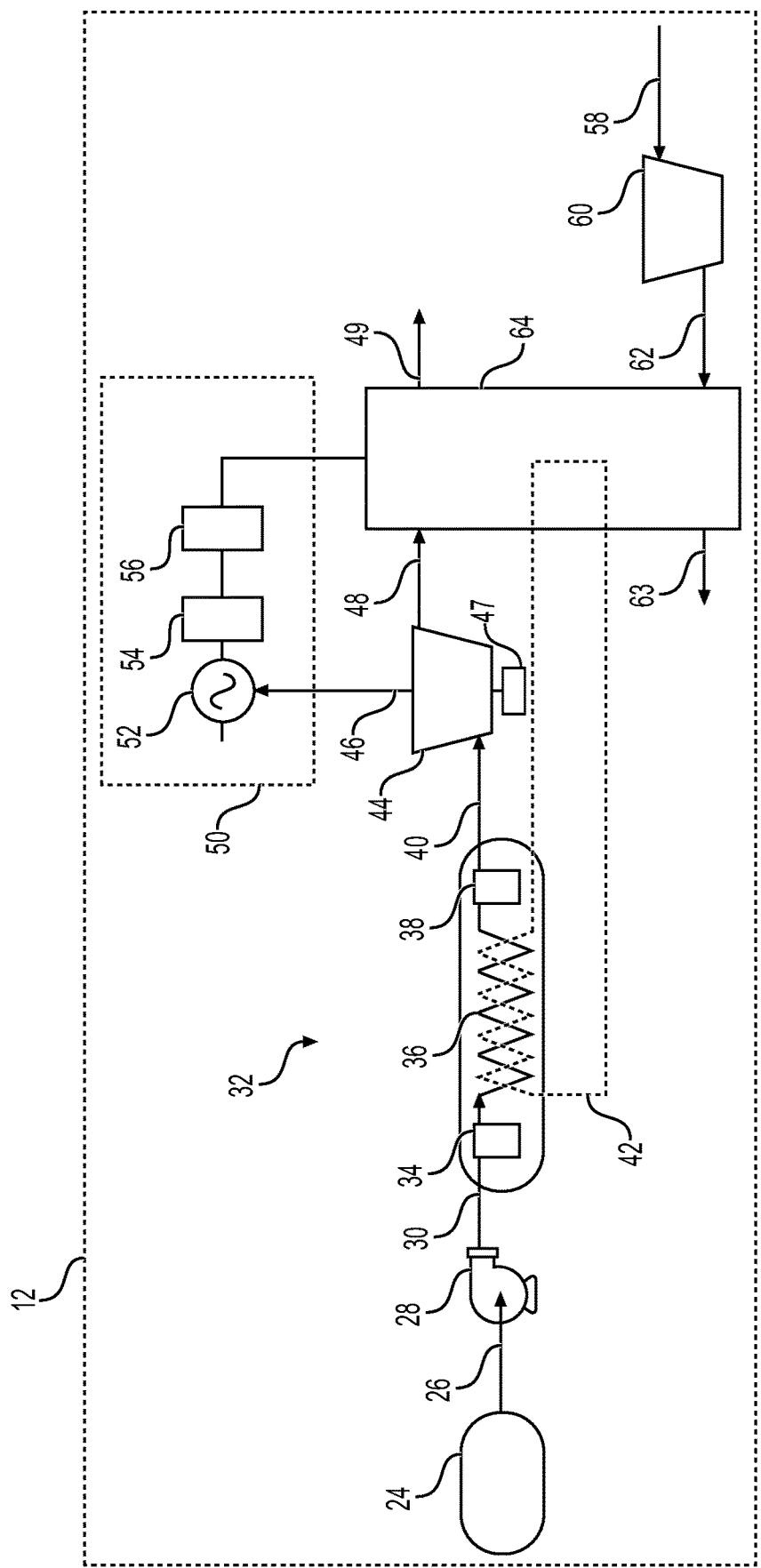
FIG. 2 is a diagram of an energy generation system, according to aspects of the disclosure.

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic. As used herein, "air" and "oxygen" are to be interpreted expansively, each including air drawn from the environment, and also including oxygen-containing gas supplied from a storage tank, regardless of whether the concentration of oxygen in the storage tank is the same, or higher, as the concentration of oxygen in ambient air, unless stated otherwise.

FIGS. 1A-1C illustrate an exemplary energy generation system 12 useful for generating electrical energy with a fuel, according to aspects of the present disclosure. System 12 may be useful in, for example, a data center (FIG. 1A), a mobile machine such as a mining truck 20 (FIG. 1B), an earthmoving machine (FIG. 1C), and/or other types of stationary or mobile machines. System 12 may include a power generating device that is able to process fuel and generate power for an electrical system 50, such as a fuel cell 64 that generates power by a catalyzed chemical reaction (e.g., a proton-exchange membrane fuel cell).

As shown in FIG. 1A, energy generation system 12 may be used with a stationary system, such as data center, hydrogen refueling station, or other location where liquid hydrogen is used for fuel (e.g., to generate primary or backup power), stored, and/or transferred. When present at a fixed location, energy generation system 12 may be a secondary or back-up source of electrical energy that generates power when a primary source of electrical energy, such as an electrical grid 14, fails or is otherwise unable to consistently provide a desired quantity of electricity. System 12 may be connected to a power delivery system 16 associated with the data center system 18. Power delivery system 16 may include, for example, switchgear (devices that selectively connect and disconnect circuits for controlling delivery of electrical energy), transfer switches (devices that detect failure of grid 14 and issue commands to initiate generation of backup power when the primary source of power fails), uninterruptible power supplies, and other equipment for distributing electrical energy. Data center system 18 may include data storage systems, communications systems, computing systems, server systems, databases, etc., that are powered with power delivery system 16.

As shown in FIG. 1B, energy generation system 12 may be used with a mobile system or mobile vehicle, such as a mining or haul truck 20. When used in a mobile application, energy generation system 12 may include the primary source of power (e.g., the primary source of energy for propulsion, the primary source of electrical power, and/or the primary source of energy for operating one or more hydraulic systems). While truck 20 may be a mining or haul truck as shown in FIG. 1B, system 12 may be employed in any suitable vehicle or transport machine, such as other types of dump trucks, articulated trucks, passenger vehicles, buses, etc. System 12 may generate power for propelling truck 20 (e.g., via one or more electric motors) and/or for operating one or more systems of truck 20 (e.g., systems for changing a position of a bed of the truck by powering hydraulic pumps and/or hydraulic valves). When employed in a mobile system or mobile vehicle, system 12 may be the primary power source for propelling machine 20 and/or for operating the hydraulic system(s) of machine 20.

As shown in FIG. 1C, energy generation system 12 may be used with a machine for performing work, such as an earthmoving machine 22. While machine 22 may be an excavator as shown in FIG. 1C, system 12 may be employed in other types of machines, such as dozers, pavers, compactors, drills, motor graders, pipelayers, loaders, draglines, etc. System 12 may generate power for propelling machine 22 and/or operating one or more ground-engaging implement systems of machine 22. For example, system 12 may generate power used for propelling machine 22 and for operating one or more implements 23 of machine 22 (e.g., a boom, a stick, and a bucket 23 of machine 22 that allow machine 22 to engage and transport material).

FIG. 2 is a diagram illustrating energy generation system 12, which may be used with a data center, vehicle, or earthmoving or other type of machine, as described above. System 12 may include a fuel supply path, an air supply path, a fuel cell 64 or internal combustion engine, and one or more electrical systems 50. System 12 may be configured for generating energy during regasification of a fuel. In particular, system 12 may enable generation of electrical and/or mechanical energy when transitioning liquid hydrogen to gaseous hydrogen, a process referred to as regasification. To capture energy during regasification, system 12 may include an expander 44 connected to a generator 52. System 12 may include a liquid fuel storage 24, a pump, such as cryopump 28, a heat exchanger 32, fuel expander 44, a mechanical device 47 (e.g., a cooling fan), a fuel cell 64, electrical system 50, and an air compressor 60.

A fuel supply path for delivering fuel to fuel cell 64 may include fuel storage 24, a liquid fuel supply passage 26 that connects fuel storage 24 to cryopump 28, a pressurized fuel passage 30 connected between cryopump 28 and an evaporator 36 of heat exchanger 32, a gaseous fuel passage 40 connected between heat exchanger 32 and expander 44, and a fuel cell inlet passage 48 extending from an outlet of expander 44 to an outlet of fuel cell 64. Fuel storage 24 may include one or more storage devices, such as fuel tanks, that are configured to store fuel in a liquid form. Cryopump 28 may be a sealed, substantially leak-free cryogenic pump configured to output a pressurized flow of liquid fuel. Cryopump 28 may be capable, for example, of pressurizing liquid hydrogen to a pressure of greater than about 30 bar and, in particular, to a pressure of between about 30 bar and about 100 bar.

An outlet of cryopump 28 may be connected to an inlet of heat exchanger 32 via pressurized fuel passage 30. Heat exchanger 32 may be an evaporator-based system that is configured to increase the temperature of the liquid fuel while the fuel circulates within evaporator 36 of heat exchanger 32. Heat exchanger 32 may include a preheater 34, an evaporator 36, and a superheater 38, all within a common housing. Thus, preheater 34 may be integrated as a part of heat exchanger 32 and may include a path for warming liquid fuel before the fuel is converted to a gaseous state in evaporator 36.

Evaporator 36 may include one or more paths to facilitate evaporation of the liquid. Evaporator 36 may be connected to a fluid loop 42 in which coolant for fuel cell 64 circulates in a closed loop. Evaporator 36 may include separate fluid paths for coolant within loop 42 and fuel within evaporator 36. As used herein "coolant" refers to any fluid that tends to facilitate the addition of heat to fluid within evaporator 36. When the fluid within evaporator 36 is hydrogen, for example, "coolant" may include any fluid that has a temperature higher than liquid hydrogen. The passages within evaporator 36 may be configured to receive liquid hydrogen and provide a path for gaseous hydrogen to exit. Superheater 38 downstream of evaporator 36 may be configured to receive gaseous fuel and supply heat to vaporized fuel to heat the gaseous fuel beyond the vaporization point of the fuel.

Expander 44 may be connected downstream of heat exchanger 32 via gaseous fuel passage 40. Expander 44 may include a turbine or other driven component connected to an output shaft 46. Expander 44 may be a rotary or linear expander, such as a reciprocating expander (e.g., an expander in which a piston reciprocates within a chamber), a gerotor expander, a roots expander, a screw expander, a scroll expander, or any appropriate type of expander configured to receive fuel gas. When expander 44 includes a turbine as the driven component, this turbine may be fixed to output shaft 46 such that the turbine and output shaft 46 rotate together. Output shaft 46 of expander 44 may be directly or indirectly connected to a device for performing mechanical work, such as cooling fan 47, which may be configured to direct cooling air towards fuel cell 64 or towards an internal combustion engine. While expander 44 may be connected to both electrical system 50 and a mechanical device such as fan 47, in some configurations, expander 44 may be connected solely to one or more mechanical devices, instead of being connected to an electric-energy-generating component of electrical system 50, such as generator 52.

An outlet of expander 44 may be in fluid communication with fuel cell inlet passage 48 to supply gaseous fuel to interior passages of fuel cell 64. While fuel cell inlet passage 48 is simplified as a linear path in FIG. 2 that directly connects an outlet of expander 44 and an inlet of fuel cell 64, as understood, fuel path 48 may include additional passages and/or components that fluidly connect an outlet of expander 44 to fuel cell 64. Fuel cell inlet passage 48 may include one or more features for controlling the quantity of fuel gas provided fuel cell 64, such as a pressure regulator, humidifier, bypass and/or recirculation passages, a recirculation pump etc. Fuel may exit fuel cell 64 via an outlet, such as fuel purge 49 in which excess fuel is diluted and exhausted. Including an outlet, such as fuel purge 49, may configure system 12 as an open-loop Rankine cycle system, as the regasified hydrogen is allowed to exit system 12, instead of being condensed and returned to a liquid state.

An oxygen path may be connected to fuel cell 64 to deliver oxygen-containing gas (e.g., air) to fuel cell 64, the air being exhausted from fuel 64 via air outlet 63. The oxygen path may include an oxygen introduction passage 58 connected to an inlet of an oxygen compressor 60. Oxygen compressor 60 may include an outlet connected to an interior of fuel cell 64 via a pressurized air introduction passage 62. While air introduction passage 62 is shown as a direct passage from the outlet of oxygen compressor 60 to fuel cell 64, air introduction passage 62 may include one or more additional components, such as a humidifier that increases the water content of oxygen supplied to fuel cell 64.

Fuel cell 64 may include an anode, a cathode, an electrolyte, and a catalyst that facilitates energy-producing chemical reactions of the fuel and the oxygen. Fuel cell 64 may be a proton exchange membrane fuel cell, a solid-oxide fuel cell, etc. Fuel cell 64 may be formed with a series of individual fuel cells that together form a fuel cell stack. Fuel cell 64 may include internal passages (not shown) for fuel (received from fuel cell inlet passage 48), oxygen-containing gas (received from air introduction passage 62), and coolant. Coolant may be provided to fuel cell 64 in fluid loop 42, formed as a closed loop for supplying liquid coolant to heat exchanger 32 as well as to fuel cell 64. However, fuel cell 64 may be air-cooled with fan 47, if desired, without supplying coolant to a fuel evaporator.

Electrical system 50 may include one or more electrical components of system 12 and/or one or more electrical components associated with a data center system 18 (FIG. 1A), mobile machine (e.g., transport machine 20, FIG. 1B), an earthmoving machine 22 (FIG. 1C), or another type of machine, as described above. Fuel cell 64 may be electrically connected to electrical system 50 to supply electrical energy generated by a chemical reaction with the fuel gas and oxygen. Electrical system 50 may include generator 52, one or more energy storage devices 54, and/or one or more electrical loads 56.

Energy storage devices 54 may be electrical storage devices, such as one or more battery banks. Energy storage devices 54 may be configured as a backup source of power for system 12 that supply energy when the primary source of power (e.g., electrical grid 14 for data center system 18, as shown in FIG. 1A) fails. Loads 56 may correspond to power-consuming components of energy generation system 12 and/or power-consuming components of the system or machine in which energy generation system 12 is employed. Some examples of electrical loads 56 of system 12 may include cryopump 28, compressor 60, pumps for fluid loop 42, fans (not shown) of system 12. Examples of electrical loads 56 associated with a system or machine other than system 12 may include power delivery system 16 and data center system 18 (FIG. 1A), electrical and/or motive systems of transport machine 20 (FIG. 1B) or of earthmoving machine 22 (FIG. 1C). For example, electrical loads 56 may include electrical motors for propelling machine 20 or machine 22, and/or hydraulic pumps, hydraulic valves, etc., of a hydraulic system for operating an implement 23.

While FIG. 2 shows a system 12 in which the power generating device is fuel cell 64, system 12 may include an internal combustion engine as the power generating device. The internal combustion engine may be connected to fuel cell inlet passage 48 and to air introduction passage 62 in the manner illustrated with respect to fuel cell 64. Thus, the internal combustion engine may be configured to receive gaseous fuel, this gaseous fuel being combusted in the internal combustion engine. The engine may be configured to combust this fuel as part of a fuel mixture, such that hydrogen forms a portion, but not an entirety, of the combusted fuel. However, the hydrogen fuel may be the sole fuel supplied to the engine, if desired. The internal combustion engine may be part of an engine-generator set (also referred to as a genset). In such systems, the genset may generate the majority of the power of system 12, with generator 52 providing supplemental electrical energy.

While evaporator 36 of heat exchanger 32 may be a liquid-to-liquid heat exchanger, as described above, evaporator 36 may instead be an ambient-air evaporator. This may be useful, for example, when the fuel used in system 12 is hydrogen or another liquid fuel that has a boiling point that is below ambient temperature, and may avoid the need to connect fluid loop 42 to both heat exchanger 32 and fuel cell 64. In other embodiments, fluid loop 42 may instead be an open loop, in which exhausted air from fuel cell 64, such as exhausted air, is provided for heat exchange with evaporator 36 and subsequently exhausted to the environment.

INDUSTRIAL APPLICABILITY

System 12 may be useful in any stationary or mobile system in which pressurized fuel is expanded, and in particular, in systems and machines in which liquid fuel is expanded to a gaseous state for being supplied to a fuel cell, internal combustion engine, or other device. System 12 may be useful with various types of fuels that can be passed through an expander to capture energy that would otherwise be lost. System 12 may be configured as an open-loop Rankine cycle system that captures the energy of regasified hydrogen fuel.

Referring to FIGS. 2 and 3 system 12 may be useful in a method for generating energy, and in particular, in a method 300 (FIG. 3) for generating electrical energy with a liquid fuel. A step 302 of method 300 may include supplying liquid fuel to a heat exchanger 32. Liquid fuel may be pumped, under pressure, using cryopump 28 downstream of liquid fuel storage 24. The amount of pressure imparted to the fuel with cryopump 28 may be based on characteristics of one or more downstream components. For example, cryopump 28 may pressurize liquid fuel to an amount that enables desired operation of heat exchanger 32, expander 44, and fuel cell 64. Cryopump 28 may pressurize liquid fuel to a pressure of about 30 bar to about 100 bar, the pressure being selected based on a desired inlet pressure for fuel cell 64. This pressure may take into account expected pressure drops across heat exchanger 32 and expander 44 to ensure that fuel cell 64 receives gaseous fuel that has a suitable pressure.

Step 304 may include changing a state of the fuel from a liquid state to a gaseous state. In particular, liquid hydrogen may be converted to gaseous hydrogen by supplying pressurized liquid hydrogen to a heat exchanger 32, including preheater 34, evaporator 36, and superheater 38. Heat may be added to the liquid fuel in stages, e.g., via a preheater 34, an evaporator 36, and a superheater 38. Preheater 34 may raise the temperature of liquid hydrogen to a first temperature that is above the temperature of liquid hydrogen stored in liquid fuel storage 24 and below the boiling point of the liquid hydrogen. The temperature of this hydrogen is further increased in evaporator 36 to the boiling point of the fuel, allowing the liquid to be converted to a gas, regasifying the fuel. This gas may be received within superheater 38 that further increases the temperature of the gaseous hydrogen, resulting in a superheated gaseous fuel. While the individual steps of preheating, evaporating, and superheating hydrogen may be performed with a single heat exchanger 32 as shown in FIG. 2, one or more of these steps may be performed with a separate device (e.g., a preheater or superheater having a separate housing connected upstream or downstream of evaporator 36 of heat exchanger 32).

A step 306 may include generating electrical and/or mechanical energy, with expander 44, using the regasified fuel from heat exchanger 32. As shown in FIG. 2, expander 44 may be connected to an outlet of heat exchanger 32, such that gaseous fuel enters expander 44 and drives one or more components of expander 44 that are connected to output shaft 46. For example, the gaseous fuel may drive a turbine, a reciprocating member (e.g., a piston), a gerotor, vanes of a roots expander, screws of a screw expander, a movable scroll of a scroll expander, etc. The driven components of expander 44 may be operably connected to shaft 46 so as to rotate shaft 46 and generate electricity with generator 52. This energy may be provided to one or more energy storage devices 54 and/or electrical loads 56 of electrical system 50. In some aspects, loads 56 may include one or more components of system 12, such as cryopump 28. Mechanical energy generated with expander 44 may be transferred to one or more mechanical devices, such as cooling fan 47.

Step 308 may include supplying the gaseous fuel to fuel cell 64. In the example illustrated in FIG. 2, gaseous fuel is supplied to a hydrogen fuel cell 64. This gaseous fuel may react with oxygen (e.g., air) supplied via air introduction passage 62, in a known manner. Electricity generated with fuel cell 64 may be supplied to electrical system 50, and may be the primary source of energy generated with system 12, this energy being supplemented with energy generated with generator 52 and supplied to energy storage devices 54, electrical loads 56. As described above, this energy, as well as energy generated with generator 52, may be used as backup power for a data center, motive power for a mobile machine, and power for operating an implement.

While method 300 has been described with reference to fuel cell 64, as understood, method 300 may employ an internal combustion engine that is configured to combust gaseous fuel, either alone or in combination with one or more other types of fuel. For example, when method 300 is performed with an internal combustion engine, step 308 may include supplying at least a portion of the gaseous fuel to an internal combustion engine. Gaseous fuel, such as hydrogen, may be supplied to an engine via passage 48 and may enter combustion cylinders of the engine via respective gaseous fuel injectors. The supplied fuel may exist system 12 via an exhaust system such as fuel purge 49.

While steps 302, 304, 306, and 308 have been described in an exemplary sequence, as understood, one or more of these steps may be performed simultaneously or performed and/or repeated in a different order. Moreover, any two or more of these steps may be performed simultaneously and/or at overlapping periods of time.

Liquification of fuels that exist in gaseous form at atmospheric pressure and ambient temperature requires significant energy. The described system and method may be useful in recapturing the energy used to liquefy hydrogen, improving the efficiency of the process and providing additional energy to power one or more systems of a data center, stationary machine, or mobile machine. This energy may be captured while fuel for a fuel cell or engine expands, following the introduction of heat to the fuel. The heat supplied to the fuel may be waste heat from the fuel cell or engine, improving cooling of the fuel cell or engine and further reducing the energy demands of the system. The system and method may be useful with a variety of fuels, and may enable the use of these fuels, such as hydrogen, in a wider variety of applications. When the system employs a fuel cell, the system may enable the use of renewable hydrogen fuel, while improving the efficiency associated with use of hydrogen. Similarly, when the system employs a hydrogen-combusting engine, the system may realize improved efficiency, and may also benefit from the reduction of hydrocarbon emissions.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. An open-loop Rankine cycle system for generating energy, the system comprising:
   a liquid hydrogen storage device;
   a heat exchanger connected to the liquid hydrogen storage device and that is configured to convert liquid hydrogen to gaseous hydrogen with an evaporator;
   a fuel cell that is cooled with coolant, the coolant also being supplied to the heat exchanger to vaporize the liquid hydrogen with heat that was generated with the fuel cell;
   a pump configured to pump the liquid hydrogen from the storage device towards the heat exchanger;
   an expansion device configured to receive the gaseous hydrogen, the coolant being supplied in a closed loop that extends to the evaporator upstream of the expansion device and to the fuel cell downstream of the expansion device; and
   an outlet from which the gaseous hydrogen is exhausted.

2. The open-loop Rankine cycle system of claim 1, wherein the fuel cell is connected downstream of the expansion device, the fuel cell being configured to receive the gaseous hydrogen from the expansion device.

3. The open-loop Rankine cycle system of claim 2, wherein the fuel cell is located on a truck or an earthmoving machine.

4. The open-loop Rankine cycle system of claim 1, further including a mechanical device operably connected to the expansion device, the mechanical device configured to be driven by the expansion device when the expansion device receives the gaseous hydrogen.

5. The open-loop Rankine cycle system of claim 4, further including a generator connected to the expansion device, the generator being configured to generate electricity for operating at least one of the pump or an implement of a mobile machine.

6. An energy generation method, comprising:
   pumping liquid fuel from a storage device to a heat exchanger;
   adding heat to the liquid fuel to change the liquid fuel to gaseous fuel in an evaporator of the heat exchanger, the evaporator being connected upstream of an expander;
   receiving the gaseous fuel with the expander and generating electrical energy with a generator connected to the expander; and
   supplying the gaseous fuel to a fuel cell to generate additional electrical energy or to an internal combustion engine to combust the gaseous fuel, the fuel cell or the internal combustion engine being cooled with coolant, the coolant also being supplied to the heat exchanger to vaporize the liquid fuel with heat that was generated with the fuel cell or with the internal combustion engine.

7. The energy generation method of claim 6, wherein the liquid fuel is liquid hydrogen.

8. The energy generation method of claim 6, wherein the electrical energy generated with the generator is stored with an electric storage device that is connected to a data center, to a vehicle, or to an earthmoving machine.

9. The energy generation method of claim 6, wherein the gaseous fuel is supplied to the internal combustion engine.

10. The energy generation method of claim 6, wherein the pumping is powered with energy generated with the generator.

11. The energy generation method of claim 6, wherein the gaseous fuel is supplied to the fuel cell, and the method further includes operating an implement of a machine on which the fuel cell is secured.

12. The energy generation method of claim 6, wherein the expander includes a turbine, a reciprocating expander, a gerotor expander, a roots expander, a screw expander, or a scroll expander.

* * * * *